United States Patent
Kurihara et al.

(10) Patent No.: US 11,714,314 B2
(45) Date of Patent: Aug. 1, 2023

(54) ILLUMINATION DEVICE AND DISPLAY DEVICE

(71) Applicant: Japan Display Inc., Tokyo (JP)

(72) Inventors: Masahiko Kurihara, Tokyo (JP); Kouji Fujisawa, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/651,598

(22) Filed: Feb. 18, 2022

(65) Prior Publication Data

US 2022/0171237 A1  Jun. 2, 2022

Related U.S. Application Data

(63) Continuation of application No. PCT/JP2020/021099, filed on May 28, 2020.

(30) Foreign Application Priority Data

Aug. 23, 2019 (JP) .................. 2019-152728

(51) Int. Cl.
*G02F 1/133* (2006.01)
*G02F 1/13357* (2006.01)
*G02F 1/1335* (2006.01)

(52) U.S. Cl.
CPC .. *G02F 1/133603* (2013.01); *G02F 1/133606* (2013.01); *G02F 1/133611* (2013.01); *G02F 1/133614* (2021.01)

(58) Field of Classification Search
CPC ......... G02F 1/133603; G02F 1/133614; G02F 1/133606
USPC ...................................................... 362/97.1
See application file for complete search history.

(56) References Cited

U.S. PATENT DOCUMENTS

| 2016/0252218 A1* | 9/2016 | Fujikawa | G02F 1/1336 362/241 |
|---|---|---|---|
| 2016/0276320 A1* | 9/2016 | Hung | H01L 33/10 |
| 2018/0182940 A1 | 6/2018 | Yamamoto et al. | |
| 2019/0094616 A1* | 3/2019 | Kim | G02B 6/0051 |
| 2019/0114974 A1 | 4/2019 | Chen | |

(Continued)

FOREIGN PATENT DOCUMENTS

| JP | 2008-096765 A | 4/2008 |
| JP | 2018-107257 A | 7/2018 |
| JP | 2019-062116 A | 4/2019 |

OTHER PUBLICATIONS

International Search Report dated Aug. 11, 2020 in PCT/JP2020/021099 filed on May 28, 2020, citing documents AA-AB & AP-AQ therein, 2 pages.

(Continued)

*Primary Examiner* — Christopher M Raabe
(74) *Attorney, Agent, or Firm* — Maier & Maier, PLLC (57) ABSTRACT

According to one embodiment, an illumination device includes a wiring substrate, light emitting elements, a projection, and a protective layer. The main surface of the wiring substrate is divided into segment regions. Each of the segment regions is provided with n of the light emitting elements. N is greater than 1. The light emitting elements are independently driven in units of the segment regions. The protective layer is configured to protect the light emitting elements. The upper surface of the protective layer is located on the main surface side from the highest part of the projection.

10 Claims, 7 Drawing Sheets

(56) References Cited

U.S. PATENT DOCUMENTS

2020/0343310 A1* 10/2020 Bae .................. H01L 27/322
2022/0293674 A1* 9/2022 Sung .................. H01L 33/60

OTHER PUBLICATIONS

Office Action dated Jul. 20, 2022, in connection with corresponding Indian Application No. 202217009668 (6 pp.).

* cited by examiner

ILLUMINATION DEVICE AND DISPLAY DEVICE

CROSS-REFERENCE TO RELATED APPLICATIONS

This application is a Continuation Application of PCT Application No. PCT/JP2020/021099, filed May 28, 2020 and based upon and claiming the benefit of priority from Japanese Patent Application No. 2019-152728, filed Aug. 23, 2019, the entire contents of all of which are incorporated herein by reference.

FIELD

Embodiments described herein relate generally to an illumination device and a display device.

BACKGROUND

Generally, various illumination devices are known. For example, as an illumination device, an illumination device that illuminates a liquid crystal display panel is known. The illumination device includes a plurality of LEDs (light-emitting diodes) two-dimensionally arranged. The illumination device has a first region and a second region adjacent to each other. In the case in which the illumination device is set to emit light in the first region and is set not to emit light in the second region, this possibly leads to an event that the luminance level in the first region may decrease or the luminance level in the second region may undesirably increase.

DETAILED DESCRIPTION

In general, according to one embodiment, there is provided an illumination device comprising: a wiring substrate; a plurality of light emitting elements disposed on a main surface of the wiring substrate; a projection; and a protective layer. The main surface of the wiring substrate is divided into a plurality of segment regions. Each of the segment regions is provided with n of the light emitting elements. N is greater than 1. The light emitting elements are independently driven in units of the segment regions. The projection is located between two of the segment regions adjacent to each other, and projects upwards from the main surface. The protective layer is provided on the main surface, is in contact with a side surface of each of the light emitting elements, and is configured to protect the light emitting elements. An upper surface of the protective layer is located on the main surface side from a highest part of the projection.

According to another embodiment, there is provided a display device comprising: a display panel; and an illumination device that illuminates the display panel. The illumination device includes: a wiring substrate; a plurality of light emitting elements disposed on a main surface of the wiring substrate; a projection; and a protective layer. The main surface of the wiring substrate is divided into a plurality of segment regions. Each of the segment regions is provided with n of the light emitting elements. N is greater than 1. The light emitting elements are independently driven in units of the segment regions. The projection is located between two of the segment regions adjacent to each other, and projects upwards from the main surface. The protective layer is provided on the main surface, is in contact with a side surface of each of the light emitting elements, and is configured to protect the light emitting elements. An upper surface of the protective layer is located on the main surface side from a highest part of the projection.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

First Embodiment

Figure 1:
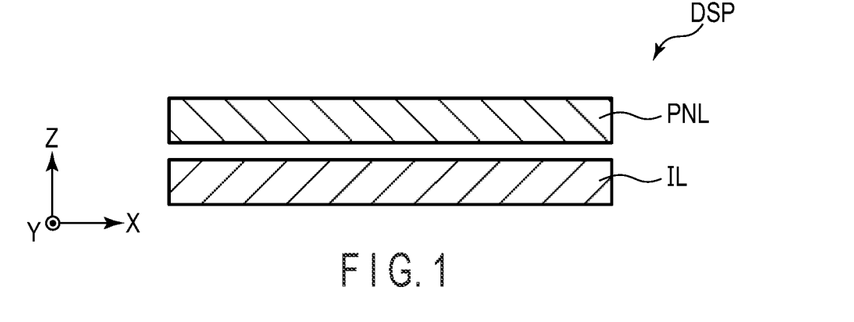
FIG. 1 is a block diagram showing a display device according to a first embodiment.

The first embodiment will now be described. FIG. 1 is a block diagram showing a display device DSP according to the first embodiment.

FIG. 1 illustrates a three-dimensional space defined by a first direction X, a second direction Y perpendicular to the first direction X and a third direction Z perpendicular to the first direction X and the second direction Y. Note that the first direction X and the second direction Y are orthogonal are orthogonal to each other, but may intersect at an angle other than ninety degrees.

In the following descriptions, the third direction Z is defined as "upward" and a direction opposite to the third direction is defined as "downward". Further, with such expressions "a second member above a first member" and "a second member below a first member", the second member may be in contact with the first member or may be remote from the first member. Further, assuming that there is an observation position for observing the display device DSP on a tip end side of the arrow indicating the third direction Z, viewing from this observation position towards the X-Y plane defined by the first direction X and the second direction Y is referred to as planar view.

The display device DSP includes a display panel PNL and an illumination device IL. In the first embodiment, the display panel PNL is a generally known transmissive or transreflective liquid crystal display panel. However, the display panel PNL is not limited to the liquid crystal display panel, and may be any display panel that requires a separate light source, such as a MEMS (Micro Electro-Mechanical System) display panel.

The illumination device IL is disposed opposite to the display panel PNL in the third direction Z. The illumination device IL is configured to emit light toward the display panel PNL to illuminate the display panel PNL. In the first embodiment, the illumination device IL functions as a backlight unit. The display panel PNL is configured to display an image by selectively transmitting light emitted from the illumination device IL.

Figure 2:
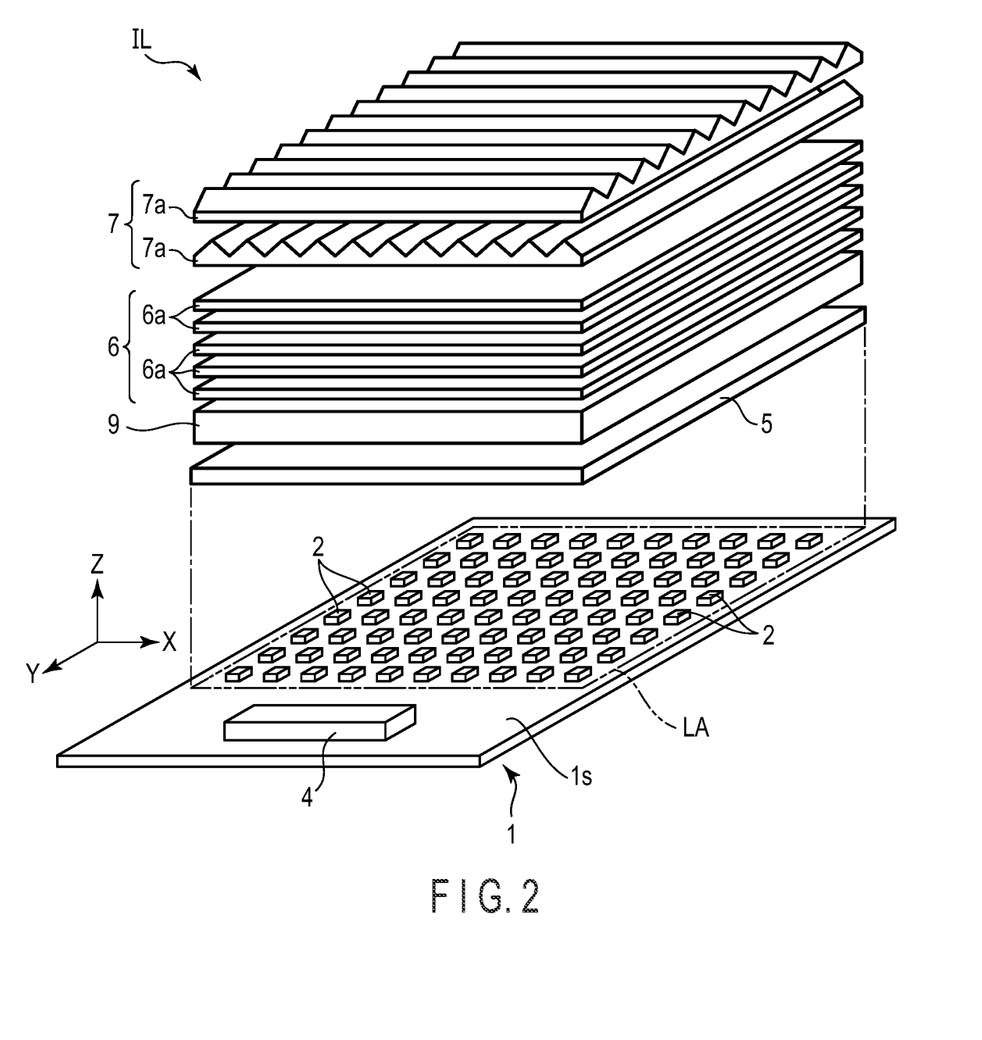
FIG. 2 is an exploded perspective view showing the illumination device shown in FIG. 1.

FIG. 2 is an exploded perspective view showing the illumination device IL shown in FIG. 1.

As shown in FIG. 2, the illumination device IL includes a wiring substrate 1, a plurality of light emitting elements 2, a driver 4, a protective layer 5, a light diffuser 6, a luminance improver 7, and a wavelength converter 9. The wiring substrate 1, the plurality of light emitting elements 2, the protective layer 5, the wavelength converter 9, the light diffuser 6, and the luminance improver 7 are stacked in the third direction Z with no gap.

The wiring substrate 1 is a printed substrate. In the present embodiment, the wiring substrate 1 is formed of a flexible printed circuit (FPC). However, the wiring substrate 1 is not limited to the flexible printed circuit, and may be formed of a printed circuit board (PCB). The wiring substrate 1 has a light emitting region LA. The light emitting region LA is opposed to at least the display region of the display panel (PNL).

The plurality of light emitting elements 2 is mounted on a main surface 1s of the wiring substrate 1. In the present embodiment, the light emitting element 2 is a mini LED (mini light-emitting diode). On the outside of the light emitting region LA, the driver 4 is mounted on the main surface 1s. The driver 4 is configured to drive the plurality of light emitting elements 2 via the wiring substrate 1.

The light emitting element 2 emits light having a specific wavelength, and the wavelength converter 9 converts and emits the wavelength of the light emitted from the light emitting element 2. The wavelength converter 9 as a wavelength conversion element is located between the protective layer 5 and the light diffuser 6. The wavelength converter 9 includes, for example, quantum dots as a light emitting material, absorbs incident light such as light emitted from the light emitting element 2, and can emit light having a wavelength longer than the wavelength of the absorbed light. For example, the light emitting element 2 is a blue LED having a main emission peak wavelength of 500 nm or less, and the wavelength converter 9 is a phosphor that absorbs the light emitted from the light emitting element 2 and emits light having a wavelength of 500 nm or more.

The light diffuser 6 is located above the plurality of light emitting elements 2. The light diffuser 6 is configured to diffuse and emit the light emitted from the light emitting element 2. In the present embodiment, the light diffuser 6 is a light diffusion film formed by stacking five light diffusion sheets 6a. However, the light diffuser 6 (light diffusion film) may be formed of one light diffusion sheet 6a, or may be formed by stacking four or less or six or more light diffusion sheets 6a.

The protective layer 5 is located between the main surface 1s and the wavelength converter 9.

The luminance improver 7 is located above the light diffuser 6. The luminance improver 7 is configured to collect and emit the light incident from the light diffuser 6 in the third direction Z. In the present embodiment, the luminance improver 7 is formed of two refractive prism sheets 7a disposed orthogonally. However, the luminance improver 7 may be formed of a total reflective prism sheet instead of the refractive prism sheet 7a. The total reflective prism sheet has the features that the total reflective prism sheet is easy to form and has excellent light use efficiency and vertical light collecting properties.

Figure 3:
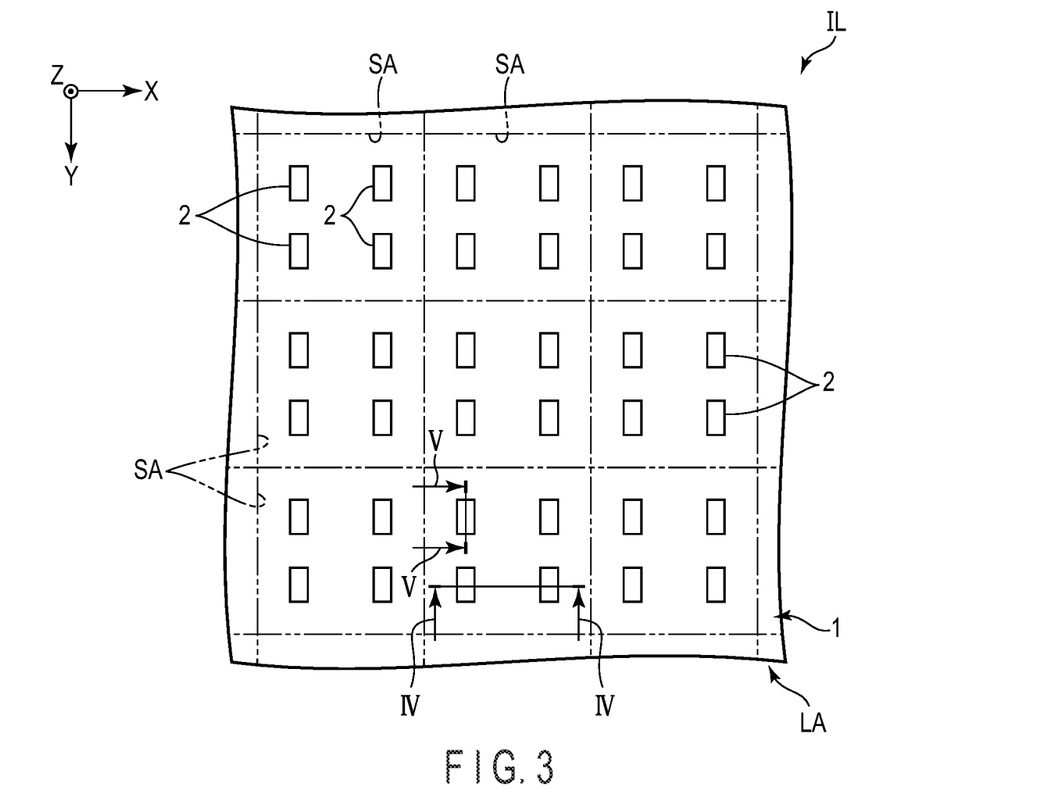
FIG. 3 is a plan view showing a part of the illumination device according to the first embodiment.

FIG. 3 is a plan view showing a part of the illumination device IL according to the first embodiment. FIG. 3 shows the wiring substrate 1 and the plurality of light emitting elements 2 of the illumination device IL.

As shown in FIG. 3, the light emitting region LA has a plurality of segment regions SA. In other words, the light emitting region LA of the main surface 1s is divided into a plurality of segment regions SA. In the first embodiment, the plurality of segment regions SA is arranged in a matrix in the first direction X and the second direction Y. For example, the plurality of segment regions SA is arranged 30 in the first direction X and 32 in the second direction Y. However, the plurality of segment regions SA does not have to be arranged in a matrix, and may be located adjacent to each other.

In addition, the segment region SA is in a square shape with a side of 2 mm. However, the size and shape of the segment region SA are not limited to the above example.

The plurality of light emitting elements 2 is arranged in a matrix in the first direction X and the second direction Y. However, the plurality of light emitting elements 2 does not have to be arranged in a matrix, and may be disposed in a predetermined pattern. The plurality of segment regions SA is each provided with n (n>1) light emitting elements 2. In the first embodiment, four light emitting elements 2 are provided in each of the segment region SA. However, two, three, or five or more light emitting elements 2 may be provided in each of the segment regions SA.

The four light emitting elements 2 provided in the segment regions SA are connected in series. The light emitting elements 2 provided in the different segment regions SA are electrically isolated from each other. The driver 4 is configured to independently drive the plurality of light emitting elements 2 in units of segment regions SA via the wiring substrate 1. For example, the driver 4 can drive the plurality of light emitting elements 2 by a method referred to as local dimming. As a result, it possible to further increase the contrast ratio.

In planar view, the light emitting element 2 has a rectangular shape. However, the shape of the light emitting element 2 may have a shape other than a rectangle such as a square shape. In planar view, the length of one side of the light emitting element 2 that is a mini LED is, for example, more than 100 µm and less than 300 µm. The length of one side of the light emitting element 2 that is a mini LED may be more than 100 µm and 200 µm or less.

Incidentally, the light emitting element 2 may be a micro LED having a longest side length of 100 µm or less as an LED having a size smaller than that of the mini LED. Alternatively, the light emitting element 2 may be an LED having the longest side length of 1 mm or less. Alternatively, the light emitting element 2 may be an LED having the longest side length of 1,000 μm or more as a general LED having a size larger than that of the mini LED. Incidentally, the length of one side of the light emitting element 2 that is a general LED is, for example, 300 μm or more and 350 μm or less.

Figure 4:
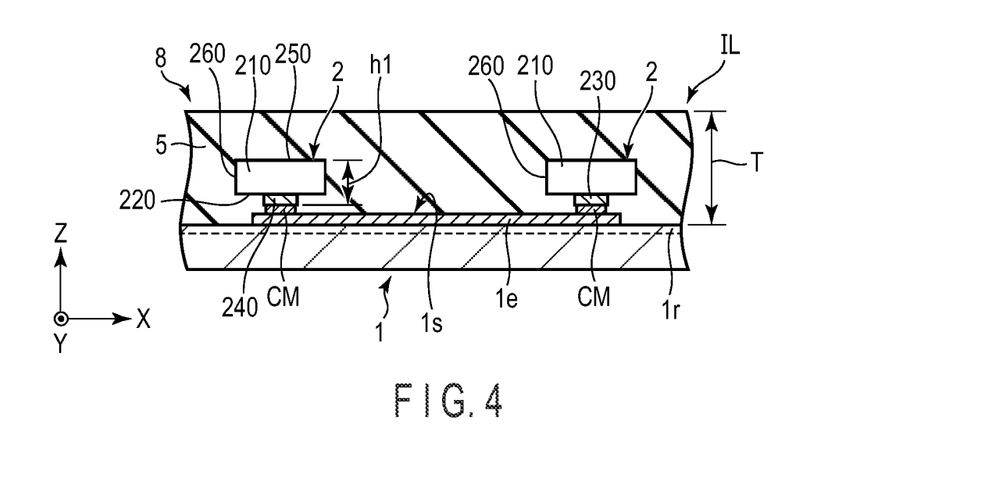
FIG. 4 is a cross-sectional view showing the illumination device taken along line IV-IV of FIG. 3.

FIG. 4 is a cross-sectional view showing the illumination device IL taken along line IV-IV of FIG. 3. FIG. 4 shows the wiring substrate 1, the plurality of light emitting elements 2, and the protective layer 5 in the illumination device IL.

As shown in FIG. 4, the light emitting element 2 is mounted on the wiring substrate 1 by a method referred to as flip-chip bonding. In flip-chip bonding, a bare chip, which is cut out from a substrate and not packaged, is connected to the wiring substrate 1 with a conductive material CM such as solder, gold, or an anisotropic conductive film. In the figure, 210 denotes an optically transparent substrate as a basement, and the light emitting element 2 has pads 230 and 240 on a surface (bottom surface 220) of the substrate 210 opposite to the wiring substrate 1. As will be described later, the light emitting element 2 has the two pads 230 and 240, one of which is connected to the anode of the light-emitting diode from the bottom surface 220 side and the other is connected to the cathode from the bottom surface 220 side.

On the wiring substrate 1, a connection electrode 1e is formed, which is made of copper foil or the like. The connection electrode 1e forms a part of the main surface 1s. The substrate 210 has a surface (top surface) 250 on the opposite side of the bottom surface 220, and in flip-chip bonding, the surface 250 of the light emitting element 2 is heated and pressed. The pads 230 and 240 are heated and pressed from the surface 250 and are connected to the connection electrode 1e via the conductive material CM such as solder, gold or the anisotropic conductive film.

Incidentally, since the surface 250 of the substrate 210 is heated and pressed, it is difficult to provide a fluorescent substance or the like on the surface 250. Therefore, after the light emitting element 2 is mounted on the wiring substrate 1, the wavelength converter 9 is formed separated from the light emitting element 2. In addition, unlike wire bonding, no connection part is formed on the surface 250 of the substrate 210, and wiring line can be shortened. In wire bonding, since the wire is connected from the surface to the wiring substrate, the length is longer than the thickness of the substrate 210, whereas in flip-chip bonding, the wiring line length is the distance from the bottom surface 220 of the substrate 210 to the wiring substrate 1.

The wiring substrate 1 is provided with a light-reflective layer 1r in addition to the connection electrode 1e. The light-reflective layer 1r forms a part of the main surface 1s together with the connection electrode 1e. In the first embodiment, the light-reflective layer 1r is a white insulating layer. For this reason, it is possible to improve the light reflectance of the wiring substrate 1 as compared with the case in which the color of the layer constituting the main surface 1s of the wiring substrate 1 is a color other than white such as green and black, and it is possible to improve the use efficiency of the light emitted from the light emitting element 2.

The protective layer 5 is provided on the main surface 1s and the plurality of light emitting elements 2, and is in contact with the main surface 1s and the plurality of light emitting elements 2. The protective layer 5 is in contact with the surface 250 and a side surface 260 of the light emitting element 2 (substrate 210). The protective layer 5 covers the connection part between the connection electrode 1e and the pad 230 (or the pad 240). The protective layer 5 is configured to protect the plurality of light emitting elements 2. The protective layer 5 is located at least in the light emitting region (LA). The wiring substrate 1, the plurality of light emitting elements 2, and the protective layer 5 constitute the light source 8 together with the driver (4).

In the first embodiment, the protective layer 5 is configured as a light transmitting layer that transmits the wavelength of the light emitted from the light emitting element 2. The protective layer 5 is made of, for example, a silicon resin. The protective layer 5 is configured to transmit the light without converting the wavelength of the light emitted from the light emitting element 2 into another wavelength. The wavelength of the light transmitted through the protective layer 5 is converted to another wavelength at the wavelength converter 9.

In the first embodiment, a height h1 of the light emitting element 2 is 80 μm, and a thickness T of the protective layer 5 is 0.3 mm.

Figure 5:
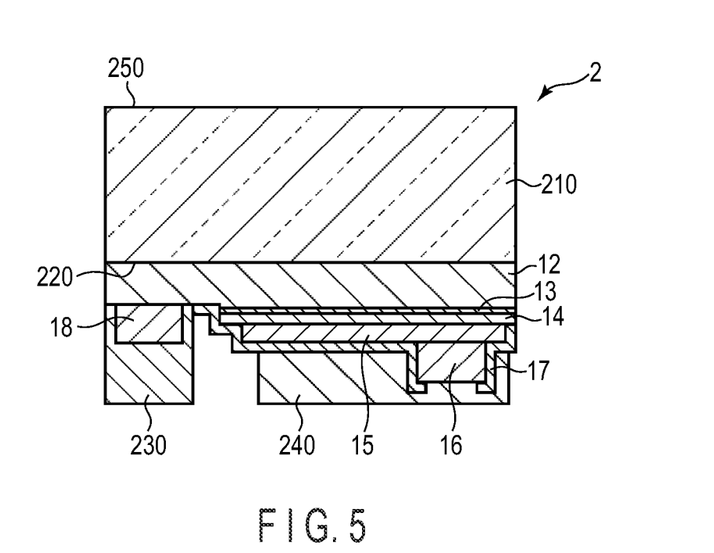
FIG. 5 is a cross-sectional view showing a light emitting element taken along line V-V of FIG. 3.

Here, an example of the structure of the light emitting element 2 will be described. FIG. 5 is a cross-sectional view showing the light emitting element 2 taken along line V-V of FIG. 3.

As shown in FIG. 5, the light emitting element 2 is a flip chip type light-emitting diode element. The light emitting element 2 includes the substrate 210 that is transparent having an insulating property. The substrate 210 is, for example, a sapphire substrate. On the bottom surface 220 of the substrate 210, a crystal layer (semiconductor layer) is formed in which an n-type semiconductor layer 12, an active layer (light emitting layer) 13, and a p-type semiconductor layer 14 are sequentially stacked. In the crystal layer (semiconductor layer), a region containing a P-type impurity is the p-type semiconductor layer 14, and a region containing an N-type impurity is the n-type semiconductor layer 12. Although the material of the crystal layer (semiconductor layer) is not specifically limited, the crystal layer (semiconductor layer) may contain gallium nitride (GaN) or gallium arsenide (GaAs).

The light reflective film 15 is made of a conductive material and is electrically connected to the p-type semiconductor layer 14. A p-electrode 16 is electrically connected to the light reflective film 15. An n-electrode 18 is electrically connected to the n-type semiconductor layer 12. The pad 230 covers the n-electrode 18 and is electrically connected to the n-electrode 18. The protective layer 17 covers the n-type semiconductor layer 12, the active layer 13, the p-type semiconductor layer 14, and the light reflective film 15, and covers a part of the p-electrode 16. The pad 240 covers the p-electrode 16 and is electrically connected to the p-electrode 16.

The illumination device IL and the display device DSP of the first embodiment are configured as described above.

In accordance with the display device DSP according to the first embodiment configured as described above, the display device DSP includes the display panel PNL and the illumination device IL. The illumination device IL includes the wiring substrate 1, the plurality of light emitting elements 2, the protective layer 5, and the like. The plurality of light emitting elements 2 is independently driven in units of the segment regions SA.

When the local dimming is performed, it is desirable that one segment region SA should emit light uniformly. It is necessary that the amount of light should be constant at each position in the area (area surrounded by two-dot chain lines in FIG. 3) of one segment region SA and the boundary between two adjacent segment regions SA which are turned on should not be visible. Furthermore, it is desirable that, when one segment region SA is turned on and another adjacent segment region SA is turned off, a light leakage (halo effect) from the on-state segment region SA to the off-state segment region SA should not occur.

In the segment region SA shown in FIG. 3, a number of light emitting elements 2 suitable for the area of the segment region SA are selected, and the light emitting elements 2 are disposed so as to emit light uniformly. Although it is known that light spreads in a spherical shape, four light emitting elements 2 are disposed, and thus it is possible to prevent the degradation of the amount of light at the four corners of the segment region SA in a square shape.

The protective layer 5 is configured to protect the plurality of light emitting elements 2. Compared with the case in which the illumination device IL is formed without the protective layer 5, it is possible to suppress the peeling of the light emitting element 2, and it is possible to intend to improve product reliability.

In the case in which the plurality of light emitting elements 2 are turned on, undesired non-uniformity of the luminance level may occur in the light emitting region LA of the illumination device IL. For example, it may lead to a situation in which the bright spots of the plurality of light emitting elements 2 are visually recognized by the user as a dot pattern. However, the illumination device IL of the first embodiment includes the light diffuser 6. For this reason, the light diffuser 6 can suppress the occurrence of undesired non-uniformity of the luminance level in the light emitting region LA.

From the above, it is possible to obtain the illumination device IL capable of controlling the light emitting region and the display device DSP including the illumination device IL. In addition, it is possible to obtain the illumination device IL having excellent product reliability and the display device DSP including the illumination device IL.

Second Embodiment

Figure 6:
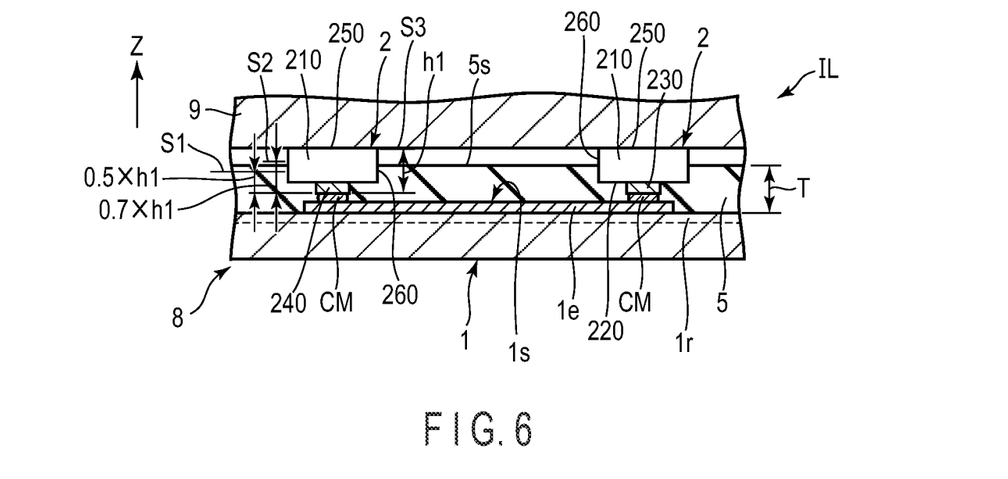
FIG. 6 is a cross-sectional view showing a part of an illumination device according to a second embodiment.

Next, a second embodiment will be described. A display device DSP has the same configuration as that of the first embodiment, except configurations described in the second embodiment. FIG. 6 is a cross-sectional view showing a part of an illumination device IL according to the second embodiment.

As shown in FIG. 6, a thickness T of a protective layer 5 is smaller than that of the first embodiment. An upper surface 5s of the protective layer 5 is located on the main surface 1s side of a plane S3 flush with a surface (top surface) 250 of a light emitting element 2. From the protective layer 5, the surface 250 of the light emitting element 2 is exposed. In that case, the upper surface 5s may be located on the plane flush with the surface 250. However, desirably, the protective layer 5 covers 50% to 70% of the light emitting element 2. Here, in the third direction Z, the surface located in the middle of a height h1 of the light emitting element 2 is referred to as a first surface S1, and the surface located at 70% of the height h1 of the light emitting element 2 is referred to as a second surface S2. The first surface S1 and the second surface S2 are parallel to an X-Y plane, respectively. Then, desirably, the upper surface 5s is rather located between the first surface S1 and the second surface S2.

Since the upper surface 5s is located on the wavelength converter 9 side from the first surface S1, the plurality of light emitting elements 2 can be further protected, and the peeling of the light emitting element 2 can be further suppressed. In addition, the portion of the light emitting element 2 that is not covered with the protective layer 5 is only a substrate 210, and the entire substrate 210 does not have to be covered with the protective layer 5.

Since the upper surface 5s is located on the main surface 1s side from the second surface S2, the surface 250 of the light emitting element 2 can be assuredly exposed. Compared with the case in which the protective layer 5 is present above the surface 250, it is possible to suppress the diffusion of the light emitted from the light emitting element 2, and it is possible to intend to improve the luminance level in the third direction Z.

The wavelength converter 9 is in contact with the surface 250 of each light emitting element 2. In the second embodiment, the wavelength converter 9 is in contact with the surface 250 of all the light emitting elements 2. Incidentally, it is not desirable that the wavelength converter 9 is in contact with the surface 250 in a part of the region and is not in contact with the surface 250 in another region. This is because non-uniformity in color and non-uniformity in luminance may occur in a light emitting region LA.

Figure 7:
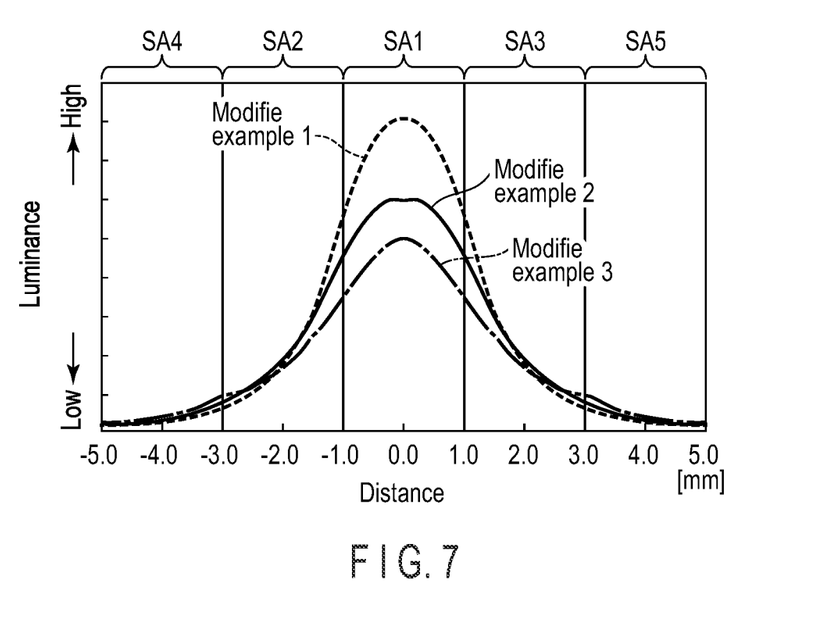
FIG. 7 is a graph showing the luminance of Modified Example 1, Modified Example 2, and Modified Example 3 of the second embodiment.

Here, the inventors of the present application simulated the optical property of the illumination device IL of each of Modified Example 1, Modified Example 2, and Modified Example 3 of the second embodiment. FIG. 7 is a graph showing the luminance of Modified Example 1, Modified Example 2, and Modified Example 3 of the second embodiment. In FIG. 7, the center of the segment region SA1 is set as a reference position (0 mm), the distance from the reference position to the right side is shown by a positive value, and the distance from the reference position to the left side is shown by a negative value.

As shown in FIG. 7, during the simulation, only the light emitting elements 2 in the segment region SA1 located in a range of −1.0 mm to 1.0 mm were turned on, and the light emitting elements 2 in the remaining segment regions SA were turned off. For example, the light emitting elements 2 were turned off in a segment region SA2 located in a range of −3.0 mm to −1.0 mm, a segment region SA3 located in a range of 1.0 mm to 3.0 mm, a segment region SA4 located in a range of −5.0 mm to −3.0 mm, and a segment area SA5 located in a range of 3.0 mm to 5.0 mm.

The luminance was obtained under the same conditions for driving the illumination devices IL of Modified Example 1, Modified Example 2, and Modified Example 3. Incidentally, the illumination device IL of Modified Example 1 is configured in the same manner as in the second embodiment except that the thickness T of the protective layer 5 is 0.15 mm. The illumination device IL of Modified Example 2 is configured in the same manner as in the second embodiment except that the thickness T of the protective layer 5 is 0.35 mm. The illumination device IL of Modified Example 3 is configured in the same manner as in the second embodiment except that the thickness T of the protective layer 5 is 0.55 mm. In any of Modified Examples 1, Modified Example 2, and Modified Example 3, the protective layer 5 covers the surface 250 of the light emitting element 2, and the wavelength converter 9 is in contact with the protective layer 5, and is not in contact with the surface 250.

It can be seen that in all of Modified Examples 1 to 3, the luminance level is maximized in the center of the segment region SA1. It can be seen that in the segment region SA1, the luminance level of Modified Example 1 is higher than the luminance level of Modified Example 2, and the luminance level of Modified Example 2 is higher than the luminance level of Modified Example 3. From the above, when the protective layer 5 does not exist above the surface 250 (the thickness of the protective layer 5 above the surface 250 is small), it is possible to suppress the diffusion of light in the protective layer 5, and it is possible to intend to improve the luminance level.

Figure 8:
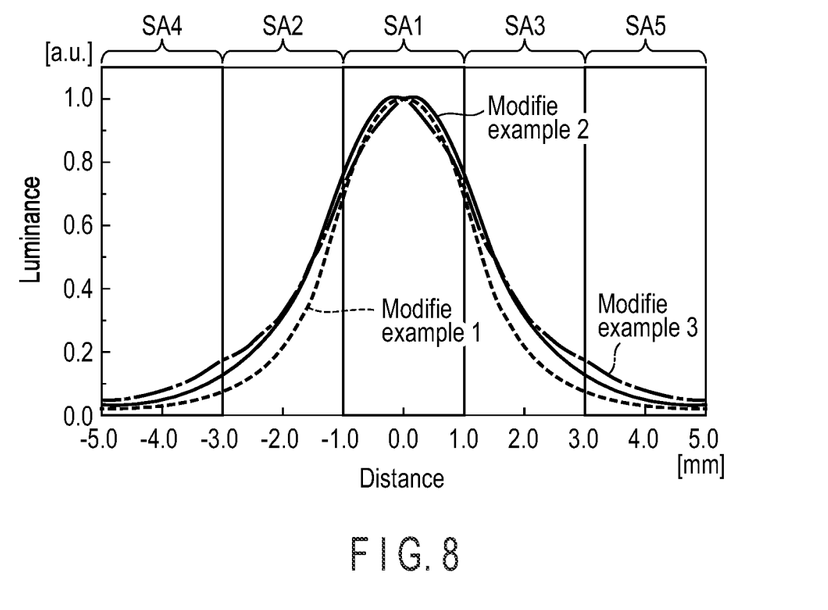
FIG. 8 is a graph showing the luminance of Modified Example 1, Modified Example 2, and Modified Example 3, which are described above.

FIG. 8 is a graph showing the luminance of Modified Example 1, Modified Example 2, and Modified Example 3, which are described above. In FIG. 8, the luminance of Modified Examples 1 to 3 is standardized such that the luminance of Modified Examples 1 to 3 at the reference position (0 mm) is one.

As shown in FIG. 8, it can be seen that the luminance level of Modified Example 1 is closer to zero than the luminance level of each of the Modified Examples 2 and 3 in the segment region SA other than the segment region SA1. In other words, in the segment region SA1 in which the luminance level is desired to be much higher, the luminance level of the Modified Example 1 is higher than the luminance levels of the Modified Examples 2 and 3, and in the segment region SA2 to a segment region SA5 in which the luminance level is desired to be much lower, the luminance level of Modified Example 1 is lower than the luminance levels of Modified Examples 2 and 3. From the above, when the protective layer 5 does not exist above the surface 250 (the thickness of the protective layer 5 above the surface 250 is small), it is possible to suppress the diffusion of light in the protective layer 5, and it is possible to further improve the contrast ratio.

In accordance with the display device DSP according to the second embodiment configured as described above, the illumination device IL is configured in the same manner as the illumination device IL according to the first embodiment. For this reason, the same effect as that of the first embodiment can be obtained in the second embodiment. Desirably, the protective layer 5 protects the light emitting elements 2 and the thickness T of the protective layer 5 is small. Desirably, the surface 250 of the light emitting element 2 is exposed from the protective layer 5. As a result, it is possible to intend to improve the luminance level and it is possible to increase the contrast ratio.

The wavelength converter 9 is in contact with the surface 250 of the light emitting element 2 or the upper surface 5s of the protective layer 5. Compared with the case in which the wavelength converter 9 is not in contact with the surface 250 or the upper surface 5s, it is possible to reduce the thickness of the illumination device IL in the third direction Z.

From the above, it is possible to obtain the illumination device IL capable of controlling the light emitting region and the display device DSP including the illumination device IL. In addition, it is possible to obtain the illumination device IL having excellent product reliability and the display device DSP including the illumination device IL. Further, it is possible to obtain the illumination device IL capable of suppressing a degradation in the contrast ratio and the display device DSP including the illumination device IL.

Third Embodiment

Figure 9:
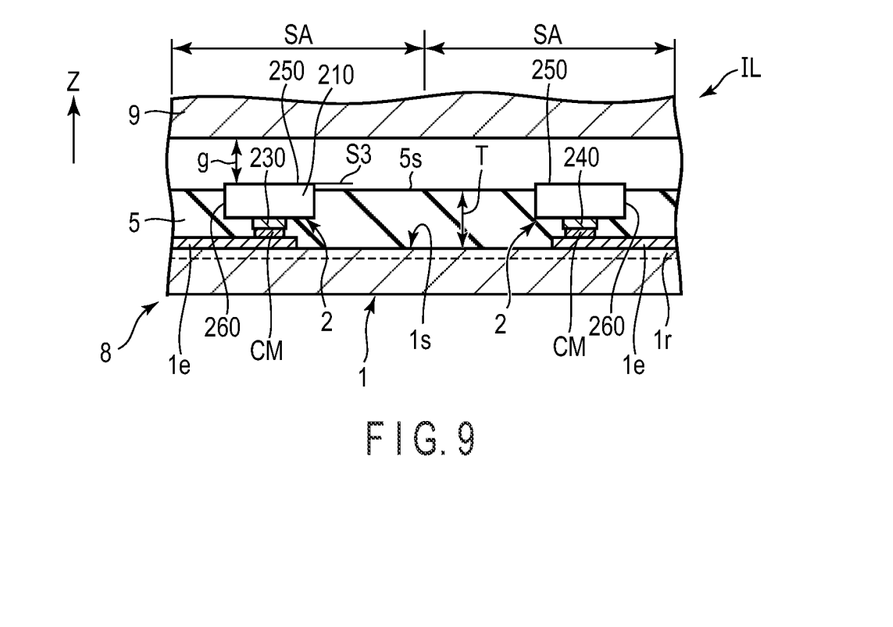
FIG. 9 is a cross-sectional view showing a part of an illumination device according to a third embodiment.

Next, a third embodiment will be described. A display device DSP has the same configuration as the second embodiment, except configurations described in the third embodiment. FIG. 9 is a cross-sectional view showing a part of an illumination device IL according to the third embodiment.

As shown in FIG. 9, a wavelength converter 9 is not in contact with a surface 250 of each of light emitting elements 2. In the third embodiment, the wavelength converter 9 is not in contact with the surfaces 250 of all the light emitting elements 2. The wavelength converter 9 is located in the third direction Z with a gap g placed on the surface 250. Between the wavelength converter 9 and the surface 250, an air layer exists.

Figure 10:
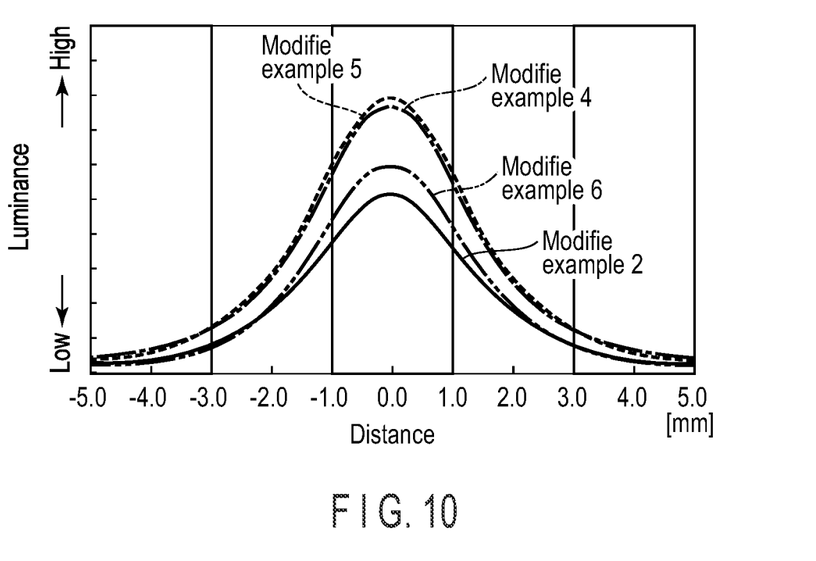
FIG. 10 is a graph showing the luminance of Modified Example 4, Modified Example 5, Modified Example 6, and Modified Example 2, which is described above, of the third embodiment.

Here, the inventors of the present application simulated the optical property of illumination device IL of each of Modified Example 4, Modified Example 5, and Modified Example 6, and Modified Example 2, which is described above, of the third embodiment. FIG. 10 is a graph showing the luminance of Modified Example 4, Modified Example 5, Modified Example 6, and Modified Example 2, which is described above, of the third embodiment. In FIG. 10, the center of the segment region SA1 is set as the reference position (0 mm), the distance from the reference position to the right side is shown by a positive value, and the distance from the reference position to the left side is shown by a negative value.

As shown in FIG. 10, at the time of the simulation, only the light emitting elements 2 in the segment region SA1 were turned on, and the light emitting elements 2 in the remaining segment regions SA were turned off. For example, in the segment regions SA2 to SA5, the light emitting elements 2 were turned off.

The luminance was obtained under the same conditions for driving the illumination device IL of each of Modified Example 4, Modified Example 5, Modified Example 6, and Modified Example 2, which is described above. Incidentally, the illumination device IL of Modified Example 4 is configured in the same manner as in the third embodiment except that the thickness T of the protective layer 5 is 0.0 mm. The illumination device IL of Modified Example 4 is formed without the protective layer 5. The illumination device IL of Modified Example 5 is configured in the same manner as in the third embodiment except that the thickness T of the protective layer 5 is 0.085 mm. The illumination device IL of Modified Example 6 is configured in the same manner as in the third embodiment except that the thickness T of the protective layer 5 is 0.17 mm. As described above, in the illumination device IL of Modified Example 2 above, the thickness T of the protective layer 5 is 0.35 mm, and the wavelength converter 9 is in contact with the protective layer 5.

In Modified Example 6 and Modified Example 2 above, the protective layer 5 covers the surface 250 of the light emitting element 2. In Modified Example 5, the upper surface 5s of the protective layer 5 is located on the plane flush with the surface 250 of the light emitting element 2. Incidentally, in Modified Example 4, Modified Example 5, Modified Example 6, and Modified Example 2 above, the distance in the third direction Z between the surface of the wavelength converter 9 opposite to the light emitting element 2 and the surface 250 is the same. The thickness of the air layer between the wavelength converter 9 and the light emitting element 2 is larger in Modified Example 5 than in Modified Example 6, and is larger in Modified Example 4 than in Modified Example 5.

It can be seen that in all of Modified Examples 4 to 6 and Modified Example 2, the luminance level is maximized in the center of the segment region SA1. It can be seen that in the segment region SA1, the luminance levels of Modified Examples 4 and 5 are higher than the luminance level of the Modified Examples 6, and the luminance level of the Modified Examples 6 is higher than the luminance level of the Modified Examples 2. From the above, when the protective layer 5 does not exist above the surface 250 (the thickness of the protective layer 5 above the surface 250 is small), it is possible to suppress the diffusion of light in the protective layer 5, and it is possible to intend to improve the luminance level.

In addition, the contrast ratio of the illumination device IL of each of Modified Examples 4 and 5 can be made higher than the contrast ratio of the illumination device IL of Modified Example 6. The contrast ratio of the illumination device IL of Modified Example 6 can be made higher than the contrast ratio of the illumination device IL of Modified Example 2. From the above, when the protective layer 5 does not exist above the surface 250 (the thickness of the protective layer 5 above the surface 250 is small), it is possible to suppress the diffusion of light in the protective layer 5, and it is possible to further improve the contrast ratio.

In accordance with the display device DSP according to the third embodiment configured as described above, the illumination device IL is configured in the same manner as the illumination device IL according to the second embodiment. For this reason, it is possible to obtain the same effect as that of the second embodiment in the third embodiment. The wavelength converter 9 may be located on the surface 250 with the gap g. Alternatively, in the case in which the protective layer 5 covers the surface 250, the wavelength converter 9 may be located with a gap on the upper surface 5s of the protective layer 5. In any case, desirably, the thickness T of the protective layer 5 is small, and thus it is possible to intend to improve the luminance level, and it is possible to increase the contrast ratio.

From the above, it is possible to obtain the illumination device IL capable of controlling the light emitting region and the display device DSP including the illumination device IL. In addition, it is possible to obtain the illumination device IL having excellent product reliability and the display device DSP including the illumination device IL. Further, it is possible to obtain the illumination device IL capable of suppressing a degradation in the contrast ratio and the display device DSP including the illumination device IL.

Fourth Embodiment

Figure 11:
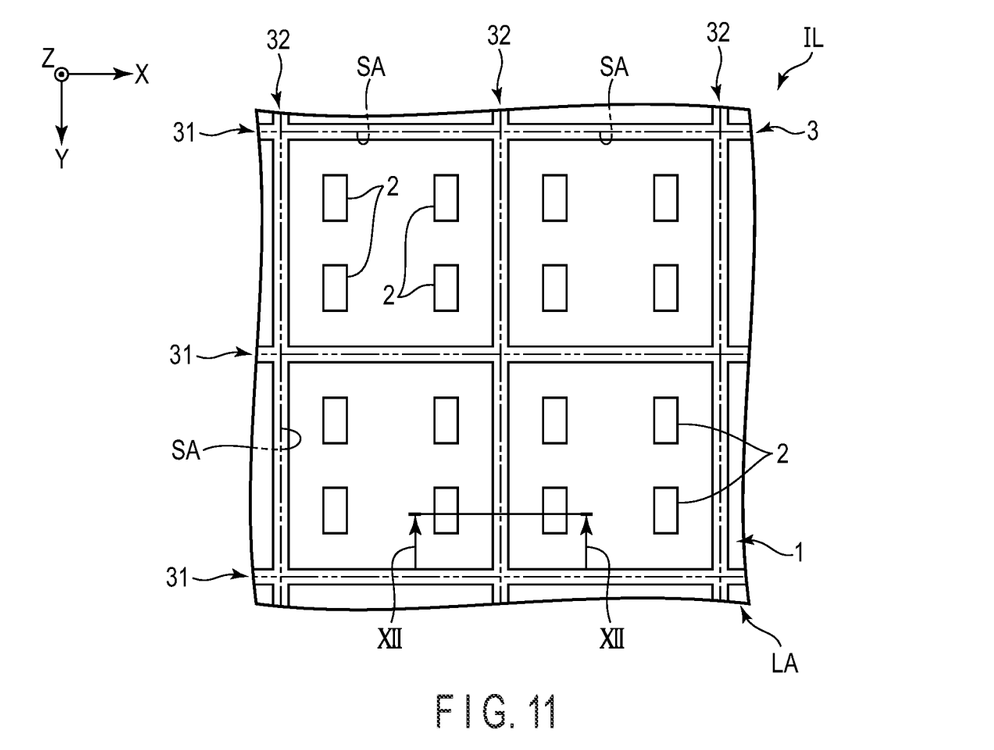
FIG. 11 is a plan view showing a part of an illumination device according to a fourth embodiment.

Next, a fourth embodiment will be described. A display device DSP has the same configuration as the second embodiment, except configurations described in the fourth embodiment. FIG. 11 is a plan view showing a part of an illumination device IL according to the fourth embodiment. FIG. 11 shows a wiring substrate 1, a plurality of light emitting elements 2, and an optical projection 3 in the illumination device IL.

As shown in FIG. 11, the illumination device IL of the fourth embodiment further includes the optical projection 3 as a projection. The optical projection 3 partitions segment regions SA. The optical projection 3 is configured to suppress light leakage from one segment region SA to an adjacent segment region SA.

The optical projection 3 elongates along the boundary of the plurality of segment regions SA. For example, a part of the optical projection 3 is provided between two adjacent segment regions SA. Since the plurality of segment regions SA is disposed in a matrix as described above, the optical projections 3 are disposed in a grid pattern along the boundary of the plurality of segment regions SA.

In the fourth embodiment, the optical projection 3 has a plurality of first optical projections 31 as a plurality of first projections and a plurality of second optical projections 32 as a plurality of second projections. The optical projection 3 is formed with the plurality of first optical projections 31 and the plurality of second optical projections 32 integrally formed. The plurality of first optical projections 31 elongates continuously in the first direction X and is arranged at intervals in the second direction Y. The plurality of second optical projections 32 elongates continuously in the second direction Y, intersects with the plurality of first optical projections 31, and is arranged at intervals in the first direction X.

Figure 12:
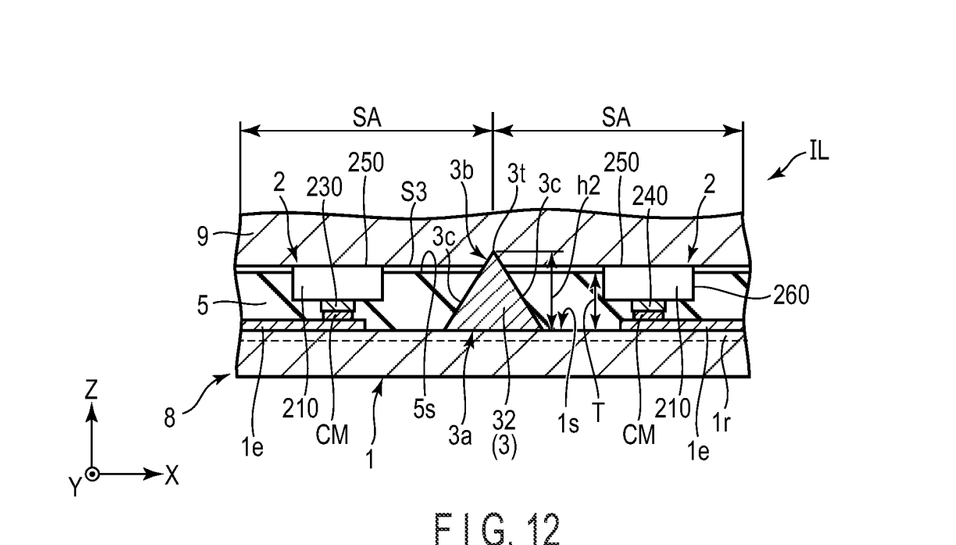
FIG. 12 is a cross-sectional view showing the illumination device taken along line XII-XII of FIG. 11.

FIG. 12 is a cross-sectional view showing the illumination device IL taken along line XII-XII of FIG. 11. FIG. 12 shows a wiring substrate 1, the plurality of light emitting elements 2, the optical projection 3, a protective layer 5, and a wavelength converter 9 in the illumination device IL.

As shown in FIG. 12, the optical projection 3 is in contact with a main surface 1s, fixed to the main surface 1s, and projects toward above the main surface is from the main surface 1s. The optical projection 3 projects from the wiring substrate 1 toward the wavelength converter 9. The optical projection 3 is a solid member. The optical projection 3 is formed by applying a material with a printing method. For this reason, no adhesive is interposed between the optical projection 3 and the main surface 1s.

In addition, with the use of the printing method, it is possible to provide the optical projection 3 between the light emitting elements 2 even though the pitch of the light emitting element 2 that is a mini LED is narrowed. Incidentally, the protective layer 5 is provided on the main surface 1s and on the optical projection 3, and is in contact with the main surface 1s, a side surface 260 of each of the light emitting elements 2, and the optical projection 3. The protective layer 5 is configured to protect the plurality of light emitting elements 2. The wiring substrate 1, the plurality of light emitting elements 2, the optical projections 3, and the protective layer 5 constitute the light source 8 together with the driver (4).

The outline of the cross-sectional shape of the optical projection 3 on the plane orthogonal to the elongating direction of the optical projection 3 has a contact line 3a and a projection line 3b. In the example of FIG. 12, the outline of the cross-sectional shape of the second optical projection 32 on the plane orthogonal to the elongating direction of the second optical projection 32 has the contact line 3a and the projection line 3b. Although not shown in the drawing, the cross-sectional shape of the first optical projection 31 is the same as the cross-sectional shape of the second optical projection 32. The contact line 3a is in contact with the main surface 1s. The projection line 3b elongates continuously from one end to the other end of the contact line 3a and projects toward above the wiring substrate 1. The projection line 3b is formed of a plurality of continuous line segments each having a corner between the line segments.

In the fourth embodiment, the cross-sectional shape of the optical projection 3 (for example, the second optical projection 32) is a triangle, one side forms the contact line 3a, and the remaining two sides form the projection line 3b. For example, the cross-sectional shape of the optical projection 3 is an isosceles triangle, and the optical projection 3 has an axis of symmetry elongating in the normal direction of the main surface 1s. The optical projection 3 has a side surface 3c elongating in a direction intersecting the main surface 1s. In addition, the two sides formed of the projection line 3b intersect to form a top 3t. The top 3t can be a point (highest point) farthest from the contact line 3a in the third direction Z in the optical projection 3.

The optical projection 3 has optical reflectivity. The optical projection 3 is formed of, for example, a material in which a light reflecting material is dispersed in a resin. The side surface 3c reflects the light emitted from the light emitting element 2 toward the wavelength converter 9. As a result, the optical projection 3 can reflect light from one segment region SA to the adjacent segment region SA. For example, the optical projection 3 can reflect light above the one segment region SA.

In the fourth embodiment, the surface 250 of the light emitting element 2 is a light-emitting surface. However, the light emitting element 2 may be configured to emit light from a surface other than the surface 250. The optical projection 3 projects beyond a plane S3 flush with the surface 250. In the fourth embodiment, a height h2 of the optical projection 3 is 0.25 mm. Incidentally, the cross-sectional shape of the optical projection 3 may be a shape other than a triangular shape such as a trapezoid shape or a semicircular shape.

An upper surface 5s of the protective layer 5 is located on the main surface 1s side from the top 3t of the optical projection 3. The thickness of the protective layer 5 can be reduced as compared with the case in which the upper surface 5s is not located on the main surface 1s side from the top 3t.

Even though the protective layer 5 is present above the surface 250, it is possible to reduce the thickness of the protective layer 5 above the surface 250. For this reason, it is possible to suppress the diffusion of light in the protective layer 5, and it is possible to intend to improve the luminance level.

In the fourth embodiment, the upper surface 5s of the protective layer 5 is located on the main surface 1s side from the plane S3 flush with the surface 250. The surface 250 is exposed from the protective layer 5. For this reason, it is possible to suppress the diffusion of the light emitted from the light emitting element 2, and it is possible to intend to improve the luminance level in the third direction Z.

In accordance with the display device DSP according to the fourth embodiment configured as described above, the illumination device IL is configured in the same manner as the illumination device IL according to the second embodiment. For this reason, it is possible to obtain the same effect as that of the second embodiment in the fourth embodiment.

The illumination device IL further includes the optical projection 3. With the optical projection 3, it is possible to intend to improve the luminance level in the on-state segment region SA. Since the halo effect is less likely to occur in the light emitting region LA, it is possible to suppress a degradation in the contrast ratio.

The thickness T of the protective layer 5 is set to a small value such that the upper surface 5s is located on the main surface 1s side from the top 3t. Compared with the case in which the upper surface 5s is not located on the main surface 1s side from the top 3t, it is possible to intend to improve the luminance level.

That is, in the fourth embodiment, both the effect of improving the luminance level by reducing the thickness T of the protective layer 5 and the effect of improving the luminance level by providing the optical projection 3 can be obtained.

Incidentally, although FIG. 12 shows a configuration in which the thickness T of the protective layer 5 is set such that the upper surface 5s of the protective layer 5 is located on the main surface 1s side from the surface 250 of the light emitting element 2, the upper surface 5s of the protective layer 5 is located between the surface 250 of the light emitting element 2 and the top 3t, and this enables obtaining the similar effect.

From the above, it is possible to obtain the illumination device IL capable of controlling the light emitting region and the display device DSP including the illumination device IL. In addition, it is possible to obtain the illumination device IL having excellent product reliability and the display device DSP including the illumination device IL. Further, it is possible to obtain the illumination device IL capable of suppressing a degradation in the contrast ratio and the display device DSP including the illumination device IL. Thus, it is possible to obtain the illumination device IL capable of suppressing the occurrence of undesired non-uniformity of the luminance level in the light emitting region LA and the display device DSP including the illumination device IL.

Fifth Embodiment

Figure 13:
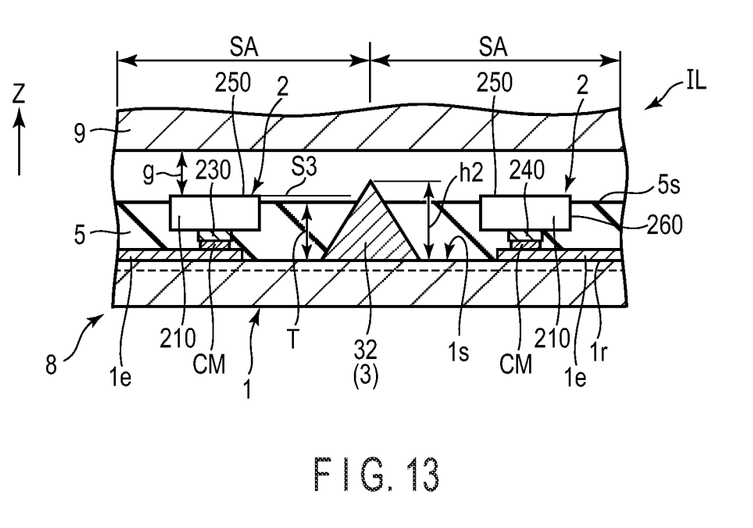
FIG. 13 is a cross-sectional view showing a part of an illumination device according to a fifth embodiment.

Next, a fifth embodiment will be described. A display device DSP has the same configuration as the fourth embodiment except configurations described in the fifth embodiment. FIG. 13 is a cross-sectional view showing a part of an illumination device IL according to the fifth embodiment.

As shown in FIG. 13, a wavelength converter 9 is not in contact with a surface 250 of each of light emitting elements 2. In the fifth embodiment, the wavelength converter 9 is not in contact with the surfaces 250 of all the light emitting elements 2. The wavelength converter 9 is located in the third direction Z with a gap g placed on the surface 250. Between the wavelength converter 9 and the surface 250, an air layer exists.

Alternatively, in the case in which the protective layer 5 covers the surface 250, the wavelength converter 9 may be located with a gap on the upper surface 5s of the protective layer 5. In any case, desirably, the thickness T of the protective layer 5 is small, and the upper surface 5s of the protective layer 5 is located on the main surface 1s side from the top 3t of the optical projection 3.

Also in the fifth embodiment configured as described above, the same effect as that of the fourth embodiment can be obtained.

Incidentally, although FIG. 13 shows a configuration in which the thickness T of the protective layer 5 is set such that the upper surface 5s of the protective layer 5 is located on the main surface 1s side from the surface 250 of the light emitting element 2, the upper surface 5s of the protective layer 5 is located between the surface 250 of the light emitting element 2 and the top 3t, and this enables obtaining the similar effect. In addition, it is also possible to dispose the wavelength converter 9 so as to be in contact with the optical projection 3.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the optical projection 3 only has to be configured to suppress light leakage from one segment region SA to an adjacent segment region SA. For this reason, the optical projection 3 may have light diffusibility or light blocking property instead of optical reflectivity.

In the case in which the light diffusing optical projection 3 is used, the luminance level of one segment region SA can be increased by the optical property of the optical projection 3, and it is possible to avoid an undesirable high luminance level of the adjacent segment region SA.

In the case in which the light-shielding optical projection 3 is used, although the optical projection 3 does not have the effect of increasing the luminance level of one segment region SA, the optical projection 3 can avoid an undesirable high luminance level of the adjacent segment region SA. For this reason, it is possible to obtain the illumination device IL capable of suppressing a degradation in the contrast ratio.

The height h2 of the optical projection 3 is not limited to the examples described above, and can be variously modified. For example, desirably, the optical projection 3 projects beyond the plane S3 flush with the surface 250. However, the optical projection 3 does not have to project beyond the flush plane S3 (FIG. 12).

The embodiment of the present invention is not limited to the illumination device IL and the display device DSP described above and are applicable to various illumination devices and display devices provided with any one of a plurality of illumination devices.

What is claimed is:

1. An illumination device comprising:
a wiring substrate;
a plurality of light emitting elements disposed on a main surface of the wiring substrate;
a projection; and
a protective layer,
wherein
the main surface of the wiring substrate is divided into a plurality of segment regions,
each of the segment regions is provided with n of the light emitting elements,
n is greater than 1,
the light emitting elements are independently driven in units of the segment regions,
the projection is located between two of the segment regions adjacent to each other, and projects upwards from the main surface,
the protective layer is provided on the main surface, is in contact with a side surface of each of the light emitting elements, and is configured to protect the light emitting elements,
an upper surface of the protective layer is located on the main surface side from a highest part of the projection,
each of the light emitting elements includes a basement,
the basement includes a bottom surface facing the main surface and a top surface opposite to the bottom surface,
the projection projects beyond a plane flush with the top surface, and
the upper surface of the protective layer is located on the main surface side from a plane flush with the top surface.

2. The illumination device according to claim 1, wherein each of the light emitting elements is a light-emitting diode having a longest length of one side of 1 mm or less.

3. The illumination device according to claim 1, further comprising
a wavelength conversion element located above the light emitting elements, the projection, and the protective layer, and applied with light emitted from the light emitting elements.

4. The illumination device according to claim 3, wherein the wavelength conversion element is in contact with the top surface of each of the light emitting element.

5. The illumination device according to claim 3, further comprising:
a light diffuser located above the wavelength conversion element, and configured to diffuse and emit light emitted from the light emitting elements; and
a luminance improver located above the light diffuser, and configured to collect and emit light incident from the light diffuser.

6. A display device comprising:
a display panel; and
an illumination device that illuminates the display panel, wherein
the illumination device includes:
a wiring substrate;
a plurality of light emitting elements disposed on a main surface of the wiring substrate;
a projection; and
a protective layer,
the main surface of the wiring substrate is divided into a plurality of segment regions,
each of the segment regions is provided with n of the light emitting elements,
n is greater than 1,
the light emitting elements are independently driven in units of the segment regions,
the projection is located between two of the segment regions adjacent to each other, and projects upwards from the main surface,
the protective layer is provided on the main surface, is in contact with a side surface of each of the light emitting elements, and is configured to protect the light emitting elements,
an upper surface of the protective layer is located on the main surface side from a highest part of the projection,
each of the light emitting elements includes a basement,
the basement includes a bottom surface facing the main surface and a top surface opposite to the bottom surface,
the projection projects beyond a plane flush with the top surface, and
the upper surface of the protective layer is located on the main surface side from a plane flush with the top surface.

7. The display device according to claim 6, wherein each of the light emitting elements is a light-emitting diode whose a longest side length is less than or equal to 1 mm.

8. The display device according to claim 6, further comprising
a wavelength conversion element located above the light emitting elements, the projection, and the protective layer, and applied with light emitted from the light emitting elements.

9. The display device according to claim 8, wherein the wavelength conversion element is in contact with the top surface of each of the light emitting elements.

10. The display device according to claim 8, further comprising:
a light diffuser located above the wavelength conversion element, and configured to diffuse and emit light emitted from the light emitting elements; and
a luminance improver located above the light diffuser, and configured to collect and emit light incident from the light diffuser.

* * * * *